US006999659B1

United States Patent
Nowak et al.

(10) Patent No.: US 6,999,659 B1
(45) Date of Patent: Feb. 14, 2006

(54) FIBER TRANSMISSION ELEMENT FOR GENERATING A CHROMATIC DISPERSION

(75) Inventors: Walter Nowak, Dresden (DE); Jens Peupelmann, Freiberg (DE); Michael Sauer, Dresden (DE); Ingolf Baumann, Dresden (DE); Johann Meissner, Dresden (DE); Dieter Palme, Munich (DE); Adalbert Bandemer, Karlsfeld (DE)

(73) Assignee: Thorlabs GmbH, Karlsfeld (DE)

( * ) Notice: Subject to any disclaimer, the term of this patent is extended or adjusted under 35 U.S.C. 154(b) by 0 days.

(21) Appl. No.: 09/936,469

(22) PCT Filed: Mar. 11, 2000

(86) PCT No.: PCT/DE00/00722

§ 371 (c)(1),
(2), (4) Date: Feb. 13, 2002

(87) PCT Pub. No.: WO00/54083

PCT Pub. Date: Sep. 14, 2000

(30) Foreign Application Priority Data

Mar. 12, 1999 (DE) ......................................... 199 11 182

(51) Int. Cl.
*G02B 6/34* (2006.01)

(52) U.S. Cl. ............................................. 385/37; 385/28
(58) Field of Classification Search ................... 385/28, 385/37
See application file for complete search history.

(56) References Cited

U.S. PATENT DOCUMENTS

| 4,953,939 A | | 9/1990 | Epworth ................... 350/96.19 |
|---|---|---|---|
| 5,430,817 A | | 7/1995 | Vengsarkar ................... 385/37 |
| 5,818,987 A | | 10/1998 | Bakhti et al. ................ 385/28 |
| 5,878,071 A | * | 3/1999 | Delavaux ..................... 372/94 |
| 5,903,683 A | * | 5/1999 | Lowry ............................ 385/1 |
| 5,993,073 A | * | 11/1999 | Hamakawa et al. .......... 385/88 |
| 6,201,907 B1 | * | 3/2001 | Farries ........................ 385/24 |
| 6,574,394 B1 | * | 6/2003 | Laming et al. ............... 385/37 |
| 6,591,038 B1 | * | 7/2003 | Pezeshki ...................... 385/37 |

FOREIGN PATENT DOCUMENTS

| EP | 0 826 990 A1 | 3/1998 |
|---|---|---|
| EP | 0 829 740 A2 | 3/1998 |

OTHER PUBLICATIONS

K. Hinton, "Dispersion Compensation Using Apodized Bragg Fiber Gratings in Transmission", *Journal of Lightwave Technology, US, IEEE*, New York, vol. 16, No. 12, pp. 2336–2346, Dec., 1998.

Litchinitser, et al., "Dispersion of Cascaded Fiber Gratings in WDM Lightwave Systems", *Journal of Lightwave Technology, US, IEEE*, New York, vol. 16, No. 8, pp. 1523–1529, Aug., 1998.

Ky, et al., Efficient Broadband Intracore, Grating $LP_{01}$–$LP_{02}$ Mode Converters for Chromatic–Dispersion Compensation, *Optics, Letters, US*, Optical Society of America, Washington, vol. 23 No. 6, pp. 445–447, Mar. 1998.

* cited by examiner

*Primary Examiner*—John D. Lee
*Assistant Examiner*—Tina M Lin
(74) *Attorney, Agent, or Firm*—Finnegan, Henderson, Farabow, Garrett & Dunner

(57) ABSTRACT

The invention describes a transmission component for producing chromatic dispersion which can be predetermined, having a glass fiber optical waveguide in which it is possible to carry not only the $LP_{01}$ fundamental mode but also at least one $LP_{mn}$ mode, and two pairs of Bragg gratings (gratings 1 and 2, as well as 3 and 4), of which at least one pair has chirped Bragg gratings, in which the first Bragg grating in each pair reflects the arriving light beam back to the other Bragg grating in a direction approximately opposite the incidence direction, and from which other Bragg grating the light beam emerges in, or at least parallel to, the original incidence direction.

22 Claims, 1 Drawing Sheet

FIBER TRANSMISSION ELEMENT FOR GENERATING A CHROMATIC DISPERSION

TECHNICAL FIELD

The invention relates to a transmission component for producing chromatic dispersion.

For the wavelength band of an erbium fiber amplifier, for example, that is to say for wavelengths x around 1550 nm, standard fibers have anormal dispersion with a dispersion parameter of D≈17 ps per nm of bandwidth and per km of fiber length. In order to compensate for this—disturbing—dispersion, it is necessary to use components with opposite, that is to say normal, dispersion (negative dispersion parameter D) of suitable magnitude, matched to the length of the standard fiber to be compensated.

PRIOR ART

Until now, compensation fibers have been used in practice to produce negative dispersion of a magnitude which is suitable to compensate for the dispersion of standard fibers and, in particular, of glass fibers. These have the disadvantage that, owing to the required length, they occupy a large amount of space and are very expensive.

DE 35 24 527 A1 discloses the use of chirped fiber Bragg gratings as compensation elements which produce the desired negative dispersion. "Chirped" means that the reflection point in the fiber Bragg grating is wavelength-dependent, so that the propagation paths and hence the propagation times are wavelength-dependent; this results in the desired (negative) dispersion which, for example, can compensate for the dispersion of a standard fiber of specific length.

A disadvantage of the compensation element which is disclosed in DE 35 24 527 A1 is that the reflected signal to which the dispersion is applied is branched off through a 3 dB fiber coupler or, according to the description in this document, preferably through a circulator. The additional 3 dB fiber coupler has a serious disadvantage of a 6 dB optical power loss, corresponding to a 12 dB electrical power loss. The circulator is once again an expensive additional element.

Furthermore, the article "Fiber Bragg gratings for dispersion compensation in transmission" by N. M. Litchinitser et al. which appeared on page 1303 of J. Lightwave Technol. 15 (1997), discloses that it is possible to use the dispersion effects which occur at the band boundaries of the fiber Bragg gratings which are used in transmission to allow the fiber Bragg grating to be used as a two-port device. However, only modest results can be expected, in comparison to reflection on chirped gratings.

It is also known for fiber Bragg gratings which (as the classical application) reflects the fiber fundamental at one wavelength and reflect in other modes at other wavelengths. This effect is referred to as contradirectional mode coupling. Reflective mode conversion occurs with appropriate dimensions.

EP 0 826 990 A1 discloses that contradirectional mode coupling can be used to achieve attenuation effects in cladding modes. Furthermore, EP 0 829 740 A3 proposes that contradirectional mode coupling be used to provide attenuation elements with different frequency characteristics in the modes that are carried, for example in the $LP_{11}$ mode.

Furthermore, what are referred to as long-period fiber gratings are known, which produce codirectional mode coupling, that is to say mode conversion in the transmission direction. Codirectional coupling in cladding modes is proposed in U.S. Pat. No. 5,430,817 and in carried modes in U.S. Pat. No. 5,818,987, in order to achieve filter effects.

The presentation "Dispersion compensation using only fiber Bragg gratings" by P. Petruzzi et al., Optical Fiber Conference (OFC) 1999, Presentation FAS, page 14 of the Conference Proceedings, shows that three gratings, one of which is chirped, can be used to achieve a transmitting dispersion two-port device instead of the reflective dispersion single-port device, thus making it possible to avoid the circulator. According to this, the second grating couples the $LP_{01}$ wave that is fed in, with contradirectional mode conversion to a first cladding mode, back to the first grating, where contradirectional mode conversion (now in the forward direction once again) to a second cladding mode takes place, which is coupled into the $LP_{01}$ fundamental codirectionally in the third grating (which must therefore be a long-periodic grating). A standard single-mode fiber is obviously used.

A first disadvantage, which is also stated at least for the present experimental configuration, is the low coupling efficiency to the cladding modes and, in particular, also the coupling efficiency between the cladding modes. A second disadvantage is the use of the two cladding modes, since these are very much more severely influenced by environmental effects, and in particular by fiber curvature, than carried modes. A further disadvantage is the use of a long-period grating, whose filter characteristic cannot be coped with as well as that of the Bragg gratings, and which require considerably long physical lengths.

In general, the documents cited above are expressly referred to in order to explain all the technical statements and/or applications that are not explained explicitly here.

DESCRIPTION OF THE INVENTION

The object of the invention is to specify a component which produces specific, normal or anormal dispersion, which can be predetermined, with a small physical size and with low cost, and whose losses are as low as possible.

One solution of this object, according to the invention, is specified in patent claim 1. Developments of the invention and an application are the subject matter of claim 2 and the subsequent claims.

According to the invention, a transmission component is provided for producing (positive or negative) chromatic dispersion which can be predetermined and is suitable, for example, for compensating for the dispersion in a glass fiber optical waveguide. Not only the $LP_{01}$ fundamental mode, but also at least one $LP_{mn}$ mode can be carried in the component according to the invention. To this end, the transmission component according to the invention has two pairs of Bragg gratings, of which, for example, each pair may have at least one chirped Bragg grating. In the transmission component according to the invention, the first Bragg grating in each pair reflects the incident radiation back to the other Bragg grating in this pair in a direction approximately opposite to the incidence direction, from where the light beam runs in the original direction of the radiation, or at least parallel to it.

In particular with regard to the production costs, it is particularly advantageous that the Bragg gratings are contradirectionally mode-coupling fiber Bragg gratings, which are preferably produced in the glass fiber optical waveguide. In this case, in addition to normal fibers, it is also possible to use special fibers which carry not only the $LP_{01}$ fundamental mode, but also a number of other modes. In this case, the coupling efficiency of these fibers and the spread of the phase coefficients can be optimized by means of an appropriate doping material and doping profile.

If the first chirped fiber Bragg grating has the larger grating constant on the input side and the smaller grating constant on the output side, then the propagation time difference increases as the wavelength becomes shorter. If the chirp direction of one grating or the other is reversed, then the propagation time difference increases as the wavelength becomes longer. It is thus possible to select the chirp direction in order to set whether the component according to the invention is intended to compensate for normal or anormal dispersion of an upstream or downward element and, in particular, of a transmission path. Suitable choice of the chirp profile also makes it possible to achieve a transition from normal to anormal dispersion.

In this case, it is preferable for all the Bragg gratings to be chirped, and/or for the two gratings in each pair to have different grating constants (ranges), in particular with opposite chirp. Chirped gratings are distinguished in that the grating constant is described by a predetermined function over their length. In general, this function is a monotonal, non-constant function. Owing to the different propagation modes, the gratings generally have different chirp ranges, and thus different grating constant ranges.

In one particularly preferred refinement of the invention, the transmission component is designed such that, in the wavelength band that is to be used, the second grating in the first pair first of all mode-couples the $LP_{01}$ fundamental (mode I), which is fed in on the input side, contradirectionally into an intermediate mode (mode II), in that the first grating mode-couples the intermediate mode contradirectionally, that is to say in the forward direction once again, into a third mode (mode III), in that the fourth grating mode-couples the third mode contradirectionally into the intermediate mode (mode II) once again, and in that the third grating mode-couples the intermediate mode contradirectionally, that is to say once again in the forward direction, into the $LP_{01}$ fundamental (mode I) which, after passing through the fourth grating, emerges on the output side with dispersion applied to it by virtue of the chirp of the gratings.

The construction of a particularly preferred refinement of the invention can thus be described as follows:

Special fibers having two pairs of fiber Bragg gratings are used; the signal wave is transmitted twice, uninfluenced, through fiber Bragg gratings in each pair, with the direction being reversed twice by carrying out contradirectional mode coupling twice. Three different modes must be used for this purpose. In the first grating pair, the $LP_{01}$ fundamental mode (first mode) is coupled via an intermediate mode (second mode) into a third mode, and is coupled back in the second grating pair from the third mode via, for example, the same intermediate mode into the $LP_{01}$ fundamental.

Dimensioning information is quoted in the exemplary embodiment described with reference to the drawing.

The rotationally symmetrical modes $LP_{02}$ and $LP_{03}$ are advantageously used in the multimode glass fiber optical waveguide. However, non-rotationally-symmetrical modes, such as the $LP_{11}$ mode, may also be used. Then, the fiber Bragg gratings must be produced slightly obliquely with respect to the fiber axis. In addition to the two carried modes, a cladding mode may also be used. In comparison to the proposal quoted in the cited presentation by P. Petruzzi et al., mode coupling between cladding modes is avoided, so that this results in considerably better coupling efficiency.

The component according to the invention may carry out dispersion compensation over a wide bandwidth. A wide component bandwidth requires a large spread, which is as equidistant as possible, in the phase coefficients of the modes to be coupled and any interference modes. This is the situation, for example, in a parabolic optical waveguide. The refractive index decreases in accordance with a square law over the radius in its core.

The coupling effectiveness of different modes in fiber Bragg gratings can be improved if, in addition to radial regions with the normal $GeO_2$ doping, regions with F-and/or $B_2O_3$ doping are also used.

BRIEF DESCRIPTION OF THE DRAWING

The invention will be explained in more detail in the following text with reference to the drawing, in which.

DESCRIPTION OF AN EXEMPLARY EMBODIMENT

Figure 1:
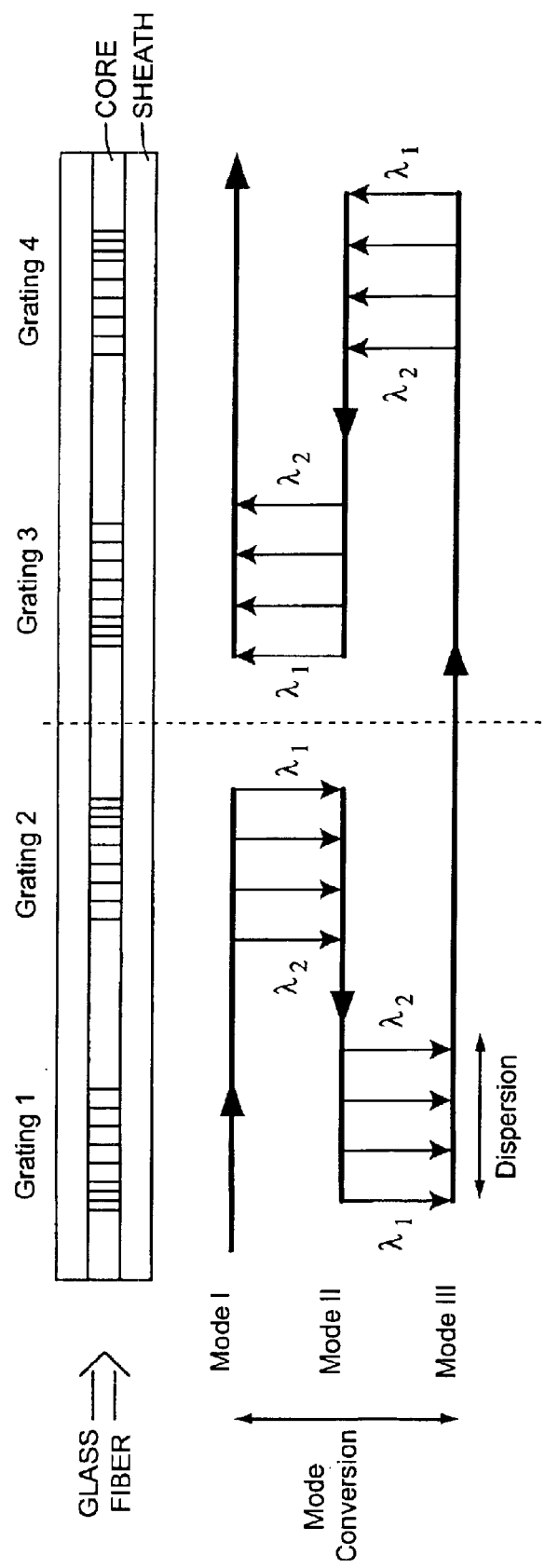
FIG. 1 shows an exemplary embodiment of the invention.

FIG. 1 shows a fiber—in particular a glass fiber—GF with a core K and a sheath M; in the illustrated exemplary embodiment, four fiber Bragg gratings 1 to 4 are produced in the core K. The gratings 1 and 2 form the first pair, and the gratings 3 and 4 form the second pair.

The fiber Bragg gratings in a pair have different grating constant ranges and, in the illustrated exemplary embodiment, are shown with a chirp which is in each case in the opposite direction in the gratings in one pair. The gratings can be produced in a known manner by varying the refractive index in the basic material of the fiber. For example, the glass fiber GF may be doped with $GeO_2$, F— and/or $B_2O_3$ in order to produce the refractive index profile. Alternatively, it is also possible to produce the refractive index profile by ion exchange, or by other known methods.

Furthermore, the lower part of the drawing shows (schematically) the mode sequence, that is to say the mode conversion between the modes I, II and III by the gratings 1 ... 4 of the component according to the invention, that is to say the mode conversion carried out in the individual gratings.

Contradirectional mode coupling takes place when the relationship $$\Lambda = 2\pi/(\beta_1 + \beta_2)$$

is satisfied between the phase coefficients $\beta_1$ and $\beta_2$ of the modes to be coupled and with the grating period length $\Lambda$. In FIG. 1, the incoming $LP_{01}$ fundamental, which is in mode I, passes through the grating 1 without being influenced, since $$\Lambda \neq 2\pi/(\beta_I + \beta_i)$$

for any i. It is reflected as the mode II on the grating 2 since $$\Lambda_2 = 2\pi/(\beta_I + \beta_{II})$$

and this mode II is reflected in the forward direction once again on the grating 1 as mode III since $$\Lambda_I = 2\pi/(\beta_{II} + \beta_{III})$$

and passes through the grating 2 without being influenced, since $$\Lambda_2 \neq 2\pi/(\beta_{III} + \beta_i)$$

for any i. In the second grating pair in FIG. 1, where $\Lambda_4=\Lambda_1$ and $\Lambda_3=\Lambda_2$, the described passages and mode coupling are repeated, in the opposite sequence and direction. Coupling takes place from the mode III in the grating 4 contradirectionally to the intermediate mode II, and contradirectionally (once again in the forward direction) from this intermediate mode II in the grating 3 into the $LP_{01}$ fundamental (mode I).

If the grating chirp is the opposite of that shown in FIG. 1, then it can be seen that, in the illustrated exemplary embodiment, the shortest wavelength $\lambda_1$ has to travel the furthest distance, and the longest wavelength $\lambda_2$ the shortest distance, in all the gratings. The effect of all the gratings is thus additive, and the overall length corresponds approximately to that of a conventional, reflective dispersion compensation grating. Since the group propagation time $t_g$ is approximately proportional to the path length, $dt_g/d\lambda<0$. This means that normal dispersion is produced. However, it is, of course, also possible to "reverse" the chirp so that anormal dispersion is produced.

The invention has been described above using an exemplary embodiment without any restriction to the general idea of the invention or to general applicability. Widely differing modifications are, of course, possible:

For example, instead of four chirped fiber Bragg gratings, it is possible to use only two chirped—for example in the first pair—and two unchirped fiber Bragg gratings in the other pair. The chirped fiber Bragg gratings ensure the path length difference and hence the propagation time difference, while the unchirped fiber Bragg gratings just produce the transformation between the various modes, and/or also carry out wavelength-selective filtering.

Furthermore, in order to increase the path length differences and hence the propagation time difference, a number of arrangements according to the invention can be connected or arranged in series.

INDUSTRIAL APPLICABILITY

The components according to the invention can be used for all applications in which it is necessary to provide normal dispersion of a specific magnitude governed by the respective application. In particular, the components according to the invention can be used to compensate for the anormal dispersion in glass fibers, such as those used for data transmission. The magnitude of the dispersion applied by the components according to the invention is then dependent on the length of the glass fiber path to be compensated.

The (approximate) magnitude of the propagation time difference between the extreme values of the wavelengths $\lambda_1$ and $\lambda_2$ which occur, which magnitude governs the anormal dispersion that can be compensated for, is set by the individual fiber Bragg gratings being formed in the fiber GF. Adjustable dispersion, and hence variable adjustment of the propagation time difference and thus trimming to different chromatic dispersions for the transmission fibers to be connected can be carried out by applying defined mechanical forces—tensile, strain and/or compressive stresses—and/or by adjustment or thermal stabilization of the fiber Bragg gratings.

What is claimed is:

1. A transmission component for producing normal and anormal chromatic dispersion which can be predetermined, comprising:
    a glass fiber optical waveguide structure to carry not only a fundamental mode, and
    two pairs of Bragg gratings, of which at least one pair has chirped Bragg gratings,
    in which a first Bragg grating in each said pair reflects an arriving light beam back to another Bragg grating in said pair, in a direction approximately opposite a forward direction of incidence of the light beam, and from which other Bragg grating the light beam emerges substantially along the direction of incidence.

2. The transmission component as claimed in claim 1, wherein the Bragg gratings are contradirectionally mode-coupling fiber Bragg gratings, provided in a glass fiber optical waveguide.

3. The transmission component as claimed in claim 1, wherein all the Bragg gratings are chirped.

4. The transmission componenet as claimed in claim 3, wherein the two gratings in each said pair have different grating constant ranges and opposite chirp.

5. The transmission component as claimed in claim 1, wherein the two pairs of Bragg gratings are arranged in order as a first through a fourth gratings, wherein in an operational wavelength band, the second grating in the first pair first mode-couples the fundamental mode, which is fed in on an input side, contradirectionally into an intermediate mode,
    wherein the first grating mode-couples the intermediate mode contradirectionally, that is to say in the forward direction once again, into a third mode,
    wherein the fourth grating mode-couples the third mode contradirectionally into the intermediate mode once again, and
    wherein the third grating mode-couples the intermediate mode contradirectionally, that is to say once again in the forward direction, into the fundamental mode which, after passing through the fourth grating, emerges on an output side with dispersion applied to it by virtue of chirp of the chirped gratings.

6. The transmission component as claimed in claim 1, wherein a parabolic refractive index profile is provided in a core of the glass fiber optical waveguide, in order to produce the Bragg gratings.

7. The transmission component as claimed in claim 6, wherein the glass fiber optical waveguide is doped with at least one of $GeO_2$, F— and $Be_2O_3$ in order to produce the refractive index profile.

8. The transmission component as claimed in claim 1, wherein the glass fibers have approximately the same mode field radius as the fibers that are to be connected.

9. The transmission component as claimed in claim 1, wherein rotationally symmetrical modes $LP_{01}$, $LP_{02}$, and $LP_{03}$ are carried by the component.

10. The transmission component as claimed in claim 9, wherein non-rotationally symmetrically carried modes are also carried by the component, and wherein the Bragg gratings are arranged obliquely rather than at right angles with respect to a fiber axis of the glass fiber optical waveguide.

11. The transmission component as claimed in claim 1, wherein a cladding mode is also used in addition to two modes which are carried by the glass fiber optical waveguide.

12. The transmission component as claimed in claim 1, wherein the gratings are chirped linearly for first-order dispersion compensation.

13. The transmission component as claimed in claim 1, further comprising means for applying to the glass fiber optical waveguide at least one of defined mechanical forces and temperature stabilization at a suitable value within a specific temperature range, in order to set a propagation time difference between extreme values for wavelengths that are used.

14. The transmission component as claimed in claim 1, wherein at least two said components are connected in series.

15. The transmission component as claimed in claim 1, wherein the light beam emerges in a direction that is one of in the direction of incidence, and substantially parallel to the direction of incidence.

16. The transmission component as claimed in claim 2, characterized in that all the Bragg gratings are chirped.

17. The transmission component as claimed in claim 2, characterized in that the two gratings in each pair have different grating constant ranges and opposite chirp.

18. The transmission component as claimed in claim 3, characterized in that the two gratings in each pair have different grating constant ranges and opposite chirp.

19. The transmission component as claimed in claim 1, wherein the gratings are chirped non-linearly for high-order dispersion compensation of one or more of the gratings.

20. A method for producing normal and anormal chromatic dispersions which can be predetermined, comprising:

applying an incident light beam in a forward direction onto a glass fiber optical waveguide structured to carry not only a fundamental mode but also at least one other mode, and at least two pairs of Bragg gratings, of which at least one pair had chirped Bragg gratings, and, causing a first Bragg grating in each said pair to reflect an arriving light beam back to an other Bragg grating in said pair, in a direction approximately opposite the forward direction, and from which other Bragg grating the light beam emerges substantially along the direction of incidence.

21. The method as claimed in claim 20, comprising providing two said gratings in each said pair with different grating constant ranges and opposite chirp.

22. The method as claimed in claim 20, comprising arranging the two pairs of Bragg gratings in order as a first through a fourth grating, wherein in an operation al wavelength band, the second grating in the first pair first mode-couples the fundamental mode, which is fed in on an input side, contradirectionally into an intermediate mode, wherein the first grating mode-couples the intermediate mode contradirectionally, that is to say in the forward direction once again, into a third mode, wherein the fourth grating mode-couples the third mode contradirectionally into the intermediate mode once again, and wherein the grating mode-couples the intermediate mode contradirectionally, that is to say once again in the forward direction, into the fundamental mode which, after passing through the fourth grating, emerges on an output side with dispersion applied to it by virtue of chirp of the chirped gratings.

* * * * *